(12) United States Patent
Wang

(10) Patent No.: US 12,192,565 B2
(45) Date of Patent: Jan. 7, 2025

(54) TRANSPARENCY OVERLAY METHOD FOR VIRTUAL SET TOP BOX, VIRTUAL SET TOP BOX, AND STORAGE MEDIUM

(71) Applicant: NANJING ZHONGXING NEW SOFTWARE CO, LTD., Jiangsu (CN)

(72) Inventor: Boyou Wang, Jiangsu (CN)

(73) Assignee: NANJING ZHONGXING NEW SOFTWARE CO, LTD., Jiangsu (CN)

( * ) Notice: Subject to any disclaimer, the term of this patent is extended or adjusted under 35 U.S.C. 154(b) by 399 days.

(21) Appl. No.: 17/623,339

(22) PCT Filed: Jun. 28, 2020

(86) PCT No.: PCT/CN2020/098631
§ 371 (c)(1),
(2) Date: Dec. 28, 2021

(87) PCT Pub. No.: WO2021/036469
PCT Pub. Date: Mar. 4, 2021

(65) Prior Publication Data
US 2022/0377404 A1 Nov. 24, 2022

(30) Foreign Application Priority Data
Aug. 30, 2019 (CN) .......................... 201910818466.5

(51) Int. Cl.
*H04N 21/431* (2011.01)
*H04N 21/24* (2011.01)

(52) U.S. Cl.
CPC ......... *H04N 21/4312* (2013.01); *H04N 21/24* (2013.01)

(58) Field of Classification Search
None
See application file for complete search history.

(56) References Cited

U.S. PATENT DOCUMENTS

2002/0133828 A1* 9/2002 Foster ................ H04N 21/4622
725/116
2004/0095358 A1 5/2004 Takagi
(Continued)

FOREIGN PATENT DOCUMENTS

| CA | 2972332 A1 | 7/2016 |
| CN | 101146204 A | 3/2008 |

(Continued)

OTHER PUBLICATIONS

International Search Report for corresponding application PCT/CN2020/098631 filed Jun. 6, 2020; Mail date Sep. 11, 2020.
(Continued)

*Primary Examiner* — Mushfikh I Alam
(74) *Attorney, Agent, or Firm* — CANTOR COLBURN LLP

(57) ABSTRACT

The embodiments of the present disclosure provide a transparency overlay method for a virtual set top box, a virtual set top box and a storage medium. Transparency layout features of a picture presented by an application scenario of the virtual set top box are acquired; whether compression processing of transparency data is allowed for each block on the picture is determined according to the transparency layout features; and compression processing of transparency data is performed on each allowed block, and transparency overlay is performed according to transparency data sampling points less than full number of transparency data sampling points in each allowed block.

18 Claims, 6 Drawing Sheets

(56) References Cited

U.S. PATENT DOCUMENTS

| | | | | |
|---|---|---|---|---|
| 2011/0023077 A1* | 1/2011 | Simon | ............... | H04N 21/4438 |
| | | | | 725/134 |
| 2011/0087959 A1* | 4/2011 | Qiu | ............... | G06F 40/106 |
| | | | | 715/234 |
| 2013/0031582 A1* | 1/2013 | Tinsman | ............ | H04N 21/4316 |
| | | | | 725/36 |
| 2013/0185433 A1* | 7/2013 | Zhu | ................ | H04L 43/0876 |
| | | | | 709/226 |
| 2016/0073124 A1 | 3/2016 | Mrak | | |
| 2017/0025098 A1 | 1/2017 | Keramidas | | |
| 2017/0150213 A1* | 5/2017 | Cremer | ............... | H04N 21/458 |
| 2017/0163994 A1* | 6/2017 | Sanchez De La Fuente | ............... | |
| | | | | H04N 19/51 |
| 2018/0173290 A1* | 6/2018 | Nakajima | ............. | G06F 9/3877 |
| 2020/0014906 A1* | 1/2020 | Wang | ................ | G06V 20/46 |

FOREIGN PATENT DOCUMENTS

| | | |
|---|---|---|
| CN | 101321240 A | 12/2008 |
| CN | 102103463 A | 6/2011 |
| CN | 104731544 A | 6/2015 |
| CN | 102368329 A | 3/2021 |
| EP | 2670139 A1 | 12/2013 |

OTHER PUBLICATIONS

European Search Report for corresponding EP 20 85 6147; Report dated Jul. 1, 2022.

Matteo Naccari, "Binary alpha channel compression for coding of supplementary video streams", British Broadcasting Corp, Oct. 2013.

\* cited by examiner

TRANSPARENCY OVERLAY METHOD FOR VIRTUAL SET TOP BOX, VIRTUAL SET TOP BOX, AND STORAGE MEDIUM

CROSS REFERENCE

This application is a National Stage Filing of the PCT International Application No. PCT/CN2020/098631 filed on Jun. 28, 2020, which claims priority to Chinese Application No. 201910818466.5 filed on Aug. 30, 2019, the entirety of which is herein incorporated by reference.

TECHNICAL FIELD

The embodiments of the present disclosure relate to but are not limited to the technical field of image processing, and in particular, relate to but are not limited to a transparency overlay method for a virtual set top box (vSTB), a virtual set top box, and a storage medium.

BACKGROUND

Currently, in order to achieve unified management of set top boxes, reduce performance requirements and operation costs of terminal set top boxes, and solve many problems such as differences in video experiences between users of new and old set top boxes, a virtual set top box is one of development directions, that is, applications and implementations are all completed on a cloud, while a client only sends a corresponding command, and acquires feedback operation interfaces from the cloud. In this way, a virtual machine corresponding to a virtual Android system is stored in a cloud server; and a terminal user is generally connected to the server through a remote connection protocol such as free implementation of Remote Desktop Protocol (FreeRDP), Spice, etc., and similar to Windows remote desktop connection, the terminal user is connected a corresponding virtual machine, and corresponding pictures are returned to the terminal. Moreover, most work of the virtual set top box, such as User Interface (UI)/Application (APP) processing and media broadcast control, needs to be processed on the cloud (vSTB end), and the terminal (tSTB end) only needs to perform UI presentation, media stream playback, etc. Because a lot of work needs to be completed on the cloud, the performance of the cloud greatly restricts the development of virtual set top boxes.

In the related art, when a virtual machine, of a virtual set top box, located on a cloud (vSTB end) server performs graphic processing, in order to ensure that a virtual set top box terminal (tSTB end) can present lossless image quality, transparency data is usually fully transmitted. That is, when the display resolution of the terminal is considered, for example, the display resolution of the terminal is 1280*720p, the virtual machine located on the cloud completes transparency overlay by using 1280*720 sampling points, and fully transmits all the acquired 1280*720 transparency sampling point data. Such a large transmission amount of full number of transparency data greatly increases the load of the cloud server of the virtual set top box, the working speed of the virtual machine on the cloud server is limited, the timeliness of the virtual machine responding to other applications is affected, and a large amount of system resources are occupied and consumed.

SUMMARY

The embodiments of the present disclosure provide a transparency overlay method for a virtual set top box, a virtual set top box, and a storage medium, which can mainly solve the technical problem in the related art that the performance of the virtual set top box on the cloud server is affected by a low efficiency when the virtual set top box performs transparency overlay processing.

Some embodiments of the present disclosure provide a transparency overlay method for a virtual set top box, the transparency overlay method including: transparency layout features of a picture presented by an application scenario of the virtual set top box are acquired; whether compression processing of transparency data is allowed for each block on the picture is determined according to the transparency layout features; and compression processing of transparency data is performed on each allowed block, and transparency overlay is performed according to transparency data sampling points less than full number of transparency data sampling points in each allowed block.

Some embodiments of the present disclosure provide a virtual set top box, including a processor, a memory, and a communication bus; the communication bus is configured to implement connection communication between the processor and the memory; and the processor is configured to execute one or more computer programs stored in the memory, so as to implement the operations of the described transparency overlay method for a virtual set top box.

Some embodiments of the present disclosure provide a storage medium, wherein the storage medium has one or more programs stored therein, and the one or more programs may be executed by one or more processors, so as to implement the operations of the described transparency overlay method for a virtual set top box.

The beneficial effects of the embodiments of the present disclosure are described as follows. According to the transparency overlay method for a virtual set top box, the virtual set top box and the storage medium provided by the embodiments of the present disclosure, by acquiring transparency layout features of a picture presented by an application scenario of the virtual set top box; determining, according to the transparency layout features, whether compression processing of transparency data is allowed for each block on the picture; and performing compression processing of transparency data on each allowed block, and performing transparency overlay according to transparency data sampling points less than full number of transparency data sampling points in each allowed block, in certain embodiments, compression processing of transparency overlay data is performed based on blocks according to the transparency layout features, and transparency data amount acquired by performing transparency overlay on a small number of transparency data sampling points can be almost negligible, thereby reducing the overall transmission amount of the transparency data, increasing the transparency overlay efficiency, and ensuring the performance of the virtual set top box.

Additional features and corresponding beneficial effects of the present disclosure will be set forth in the following description, and it should be understood that at least some of the beneficial effects will be obvious from the illustration of the description of the present disclosure.

DETAILED DESCRIPTION OF THE EMBODIMENTS

To make the objectives, technical solutions and advantages of the present disclosure clearer, hereinafter the embodiments of the present disclosure will be further described in detail with reference to the specific embodiments in combination with the accompanying drawings. It should be understood that the specific embodiments described herein are only used to explain the present disclosure, and are not intended to limit the present disclosure.

Embodiment 1

In the related art, full number of transparency data sampling points are used, but a transmission amount of full number of transparency data greatly increases the load of a cloud server of a virtual set top box, the working speed of a virtual machine on the cloud server is limited, the timeliness of the virtual machine responding to other applications is affected, and a large amount of system resources are occupied and consumed. In order to solve the described problem, in the embodiments of the present disclosure, transparency layout features are acquired by means of intelligent block division algorithms and by collecting, counting and analyzing cloud data, and block-by-block compression processing is performed on transparency overlay data according to the transparency layout features. In addition, the real-time cloud performance can be automatically evaluated, and the sampling rate of the transparency overlay data can be dynamically adjusted, and thus the transmission amount of transparency data can be effectively reduced, the transparency overlay efficiency is increased, the performance bottleneck of transparency overlay efficiency can be solved, and the overall performance of the virtual set top box can be improved.

Figure 1:
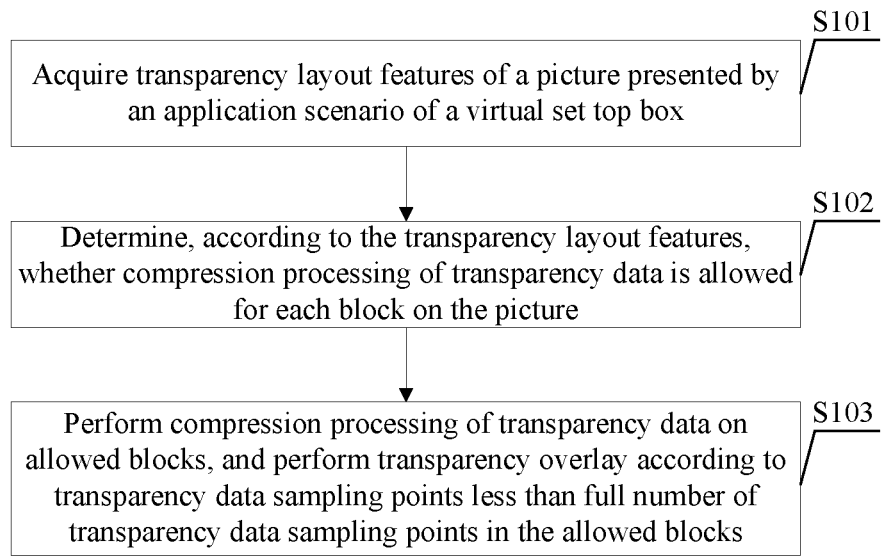
FIG. 1 is a flowchart of a transparency overlay method for a virtual set top box according to Embodiment 1 of the present disclosure.

Please refer to FIG. 1, FIG. 1 relates to a transparency overlay method for a virtual set top box according to embodiments of the present disclosure. The method includes operations S101 to S103.

At S101, transparency layout features of a picture presented by an application scenario of the virtual set top box are acquired.

Figure 2:
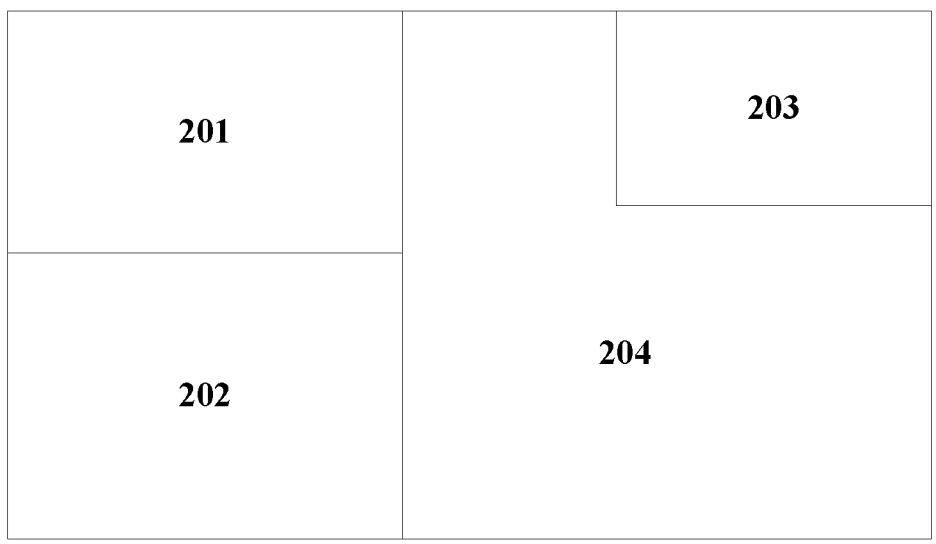
FIG. 2 is a schematic diagram of intelligent block division of a picture according to Embodiment 2 of the present disclosure.
Figure 3:
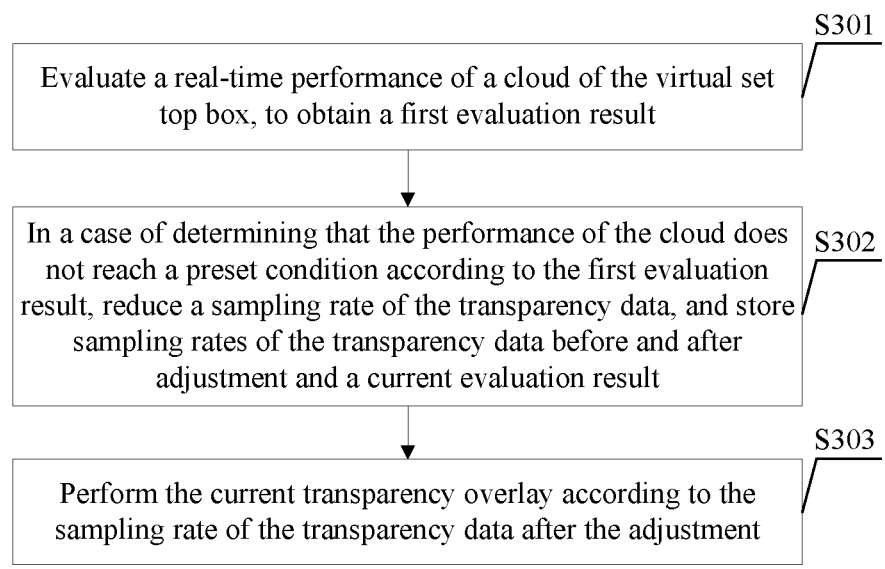
FIG. 3 is a flowchart of dynamic adjustment of transparency data according to Embodiment 1 of the present disclosure.

It can be understood that the picture presented by the application scenario of the virtual set top box is a picture that can be presented by a terminal (a tSTB end), that is, a picture on the screen of the terminal. In the embodiments of the present disclosure, the transparency layout features of the picture are acquired by dividing the picture into blocks. As an exemplary implementation, a first intelligent block division algorithm is used to perform first block division processing on the picture; in a case where transparency values of at least one first block after block division are consistent (namely, the transparency of the at least one first block is relatively monotonous and consistent), the at least one first block is locked; and a second intelligent block division algorithm is used to perform second block division processing on an entirety of unlocked blocks, and at least one second block with consistent transparency values is locked. At least two intelligent block division algorithms are used to acquire transparency layout features. Several common intelligent block division algorithms for a screen are preset in the virtual set top box. After performing initial intelligent block division by using a certain intelligent block division algorithm, it is determined whether the transparency of each block is relatively monotonous and consistent (namely, it is determined whether the transparency values of each block are the same), and if so, the block is locked. For example, if the transparency Alpha of a certain block is only 1, the transparency of the region is relatively monotonous and consistent. With regard to the remaining unlocked blocks, another intelligent algorithm is used to perform intelligent block division again, and it is determined whether the transparency of each block after the block division is relatively monotonous and consistent, and if so, the block is locked. After block division is completed by means of several common intelligent block division algorithms, the acquisition of transparency layout features is completed. For example, if four block division algorithms are preset, after the intelligent block division has been completed by using all of the four block division algorithms, the acquisition of transparency layout features ends. In some embodiments, three block division algorithms may be used for intelligent block division, and the acquisition of transparency layout features ends. Certainly, the use sequence of various block division algorithms can be flexibly adjusted according to actual requirements. The transparency layout features include locked blocks with relatively monotonous and consistent transparency, and unlocked blocks. As shown in FIG. 2, the picture includes locked first block 201, second block 202 and third block 203, and an unlocked block 204.

In the embodiments of the present disclosure, the first intelligent block division algorithm firstly used can be a sequence block division algorithm, and the specific algorithm model is to divide the length m of a screen according to the size of the screen, wherein the size of each block is block=$\sqrt{m}$, and thus a total of num=m/block blocks are acquired, and then upon calculation, it is determined that a left endpoint of each block is l[i]=(i−1)×block+1 and a right endpoint of each block is r[i]=i×block, so that a block belong[i]=(i−1)÷block+1 to which each node belongs can be acquired; then the width n of the screen is divided according to the size of the screen, wherein the size of each block is block=$\sqrt{n}$, and thus a total of num=n/block blocks are acquired, and then upon calculation, it is acquired that an upper endpoint of each block is u[i]=(i−1)×block+1 and a down endpoint of each block is d[i]=i×block, so that a block belong[i]=(i−1)÷block+1 to which each node belongs can be acquired. After sequence block division is performed respectively on the length and width of the screen according to the size of the screen, and left, right, upper and down endpoints are acquired, initial intelligent block division is completed. Then, the adopted second intelligent block division algorithm includes, but is not limited to, a tree block division algorithm, etc. In some embodiments, intelligent block division may also be performed on the basis of cloud data and according to window sizes of different windows outputted by different applications.

At S102, whether compression processing of transparency data is allowed for each block on the picture is determined according to the transparency layout features.

It should be understood that as the transparency layout features include locked blocks (the transparency of which is relatively monotonous and consistent) and unlocked regions (the transparency of which is relatively not monotonous and consistent), the locked blocks allow for compression processing of transparency data, and the compression processing does not affect the transparency data of the blocks. As there are multiple transparency values in the unlocked blocks, compression processing of transparency data is not allowed.

At S103, compression processing of transparency data is performed on each allowed block, and transparency overlay is performed according to transparency data sampling points less than full number of transparency data sampling points in each allowed block.

With regard to blocks allowing for compression processing of transparency data, compression processing of transparency data is performed, and only a small number of transparency data sampling points are arranged in the region. Herein, the small number is relative to the full number in the related art, for example, if the full number of transparency data sampling points of the block is 88×72, then the small number of transparency data sampling points in the embodiments of the present disclosure may be, for example, 72. In the embodiments of the present disclosure, the small number of transparency data sampling points even include a single transparency data sampling point, that is, transparency overlay is completed by means of the one transparency data sampling point of the block, wherein a single transparency data sampling point may be arranged in a block with a relatively small area. In some embodiments, the small number of transparency data sampling points may be randomly arranged in a block, and may also be uniformly arranged in the block. Compared with the full number of transparency data sampling points, in the embodiments of the present disclosure, the transparency data amount acquired by performing transparency overlay on the transparency data sampling points can be almost negligible. For blocks not allowing for compression processing of transparency data, full number of sampling points are used to acquire transparency data in the original manner.

It should be noted that in the embodiments of the present disclosure, the sampling rate of the transparency data can also be dynamically adjusted according to the real-time cloud performance. As an exemplary implementation, after performing transparency overlay according to transparency data sampling points less than full number of transparency data sampling points in each allowed block, dynamic adjustment process of the transparency data includes operations S301 to S303.

At S301, a real-time performance of a cloud of the virtual set top box is evaluated, to acquire a first evaluation result.

In the embodiments of the present disclosure, the first evaluation result is determined by means of a series of performance evaluation parameters (also referred to as evaluation indexes hereinafter) which can affect the performance of the cloud and the user satisfaction. The performance evaluation parameters include, but are not limited to, the working speed of a cloud virtual machine, the responding timeliness of cloud applications, the occupancy situation of cloud system resources, the CPU occupancy rate of the cloud server, the fluency of interaction between a terminal (a physical end) and the cloud, etc. A standardized algorithm can be selected for each of the performance evaluation parameters based on the distribution features of the performance evaluation parameter, so as to acquire an index evaluation value. For example, the responding timeliness of cloud applications may be acquired by dividing time consumed for completely starting several specific applications and making the several specific applications enter a working state by the optimal ideal time consumed. For another example, the fluency of interaction between a terminal (a physical end) and the cloud can be acquired by dividing the number of packet losses obtained by packet capture analysis during transmission between the cloud and the terminal (the physical end) via a protocol by the total number of packets. Regarding other evaluation parameters, performance evaluation systems in the industry can be used, and can be used as a part of a cloud performance automatic evaluation module.

The operation that a first evaluation result is determined specifically includes: an evaluation value of an ith performance evaluation parameter of the cloud is acquired; and a comprehensive evaluation value of the performance of the cloud is determined according to the evaluation value of the ith performance evaluation parameter, wherein a mathematical model constructed by using a linear weighting method can used to acquire the final comprehensive evaluation value of the performance of the cloud. For example, the mathematical model is:

$$y = \sum_{i=1}^{n} w_i x_i \ i = 1, 2, \ldots, n;$$

wherein y is the comprehensive evaluation value, $w_i$ is a weight of an ith evaluation index, $x_i$ is the evaluation value of the ith evaluation index, and n is a positive integer. In the embodiments of the present disclosure, the weights of all evaluation indexes are set by the systems, and the sum of the weights of all the evaluation indexes is 1, for example, five evaluation indexes (which are respectively the working speed of a cloud virtual machine, the responding timeliness of cloud applications, the occupancy situation of cloud system resources, the CPU occupancy rate of the cloud server, and the fluency of interaction between a terminal (a physical end) and the cloud) are included, and the weights of the five evaluation indexes are all set to be 0.2, which means that the five evaluation indexes are equally important. Of course, the weights of the evaluation indexes can be adjusted flexibly according to actual requirements.

At S302, in a case of determining that the performance of the cloud does not reach a preset condition according to the first evaluation result, the sampling rate of the transparency data is reduced, the number of the transparency data sampling points is reduced, and sampling rates of the transparency data before and after adjustment and a current evaluation result are stored.

The operation that whether the performance of the cloud satisfies a preset condition is determined according to the first evaluation result, so as to determine whether the performance of the cloud satisfies requirements includes: a second comprehensive evaluation value of the cloud of a previous evaluation before a current evaluation is acquired; a first evaluation value of the cloud of the current evaluation is compared with the second comprehensive evaluation value; in a case where the first comprehensive evaluation value is less than the second comprehensive evaluation value, it is determined that the performance of the cloud does not reach the preset condition, the sampling rate of the transparency data is appropriately reduced, the distribution of full number of transparency data sampling points in unlocked blocks is evenly reduced according to the size of the picture, which greatly reduces the transmission amount of transparency data while substantially maintaining the display picture quality of a virtual set top box terminal. Sampling rates of the transparency data before and after adjustment and the current evaluation result are stored, for providing data basis for performing dynamic adjustment of sampling rate of the transparency data next time. In the embodiments of the present disclosure, the second comprehensive evaluation value of the previous evaluation is defaulted as the comprehensive evaluation value at the moment corresponding to operation S103. For example, if the second comprehensive evaluation value of the previous evaluation is the comprehensive evaluation value A of the virtual set top box obtained through the first evaluation, after transparency overlay is performed in operation S103, at a certain time, the real-time cloud performance is evaluated to acquire a first comprehensive evaluation value B which is less than the second comprehensive evaluation value A. Assuming that the sampling rate of the transparency data corresponding to operation S103 is 60% (including a small number of sampling points in locked blocks and full number of sampling points in unlocked blocks), then the current sampling rate of the transparency data is reduced to 50%, the 10% reduction of sampling rate is acquired by reducing the number of the transparency data sampling points in the unlocked blocks, and the second comprehensive evaluation value A and the sampling rate of the transparency data 60% corresponding to the second comprehensive evaluation value A are stored, and the first comprehensive evaluation value B and the sampling rate 50% corresponding to the first comprehensive evaluation value B are stored.

At S303, the transparency overlay is performed according to the sampling rate of the transparency data after the adjustment.

Transparency overlay is performed according to the sampling rate of the transparency data after the adjustment 50%.

In the embodiments of the present disclosure, after completing the transparency overlay according to the sampling rate of the transparency data after the adjustment, a real-time performance of a cloud of the virtual set top box is re-evaluated, and if it is determined that the performance of the cloud satisfies a preset condition, that is, when the performance satisfies requirements, the sampling rate of the transparency data is restored to the sampling rate before adjustment. For example, the real-time performance of the virtual set top box is re-evaluated to acquire a third comprehensive evaluation value C, the third comprehensive evaluation value C is compared with the previous first comprehensive evaluation value B, and if the third comprehensive evaluation value C is greater than the first comprehensive evaluation value B, the sampling rate of the transparency data is restored to the sampling rate 60% before adjustment; and if the third comprehensive evaluation value C is less than the first comprehensive evaluation value B, the third comprehensive evaluation value continues to be reduced on the basis of the sampling rate 50%.

According to the transparency overlay method for a virtual set top box provided in embodiments of the present disclosure, first transparency layout features of a picture presented by a current application scenario are acquired; subsequently, the transparency layout features are triggered for analyzing, and then block-by-block processing is performed; with regard to blocks, on a screen, allowing for compression processing of transparency data, compression processing of transparency data is performed, and only a small number of or even a single transparency data sampling point are arranged, to complete the transparency overlay; and for blocks not allowing for compression processing, full number of sampling points are used to acquire transparency data in the original manner. Moreover, the current cloud performance condition is evaluated; according to the evaluation result, if the performance of the cloud cannot satisfy requirements, the sampling rate of the transparency data is appropriately reduced, and the current evaluation value and the sampling rates before and after adjustment are completely stored; and if the performance of the cloud can satisfy requirements, the sampling rate of the transparency data is dynamically restored to the original value. By means of the described transparency overlay method for a virtual set top box, the transmission amount of transparency data is effectively reduced, and the transparency overlay efficiency is increased.

Embodiment 2

Figure 4:
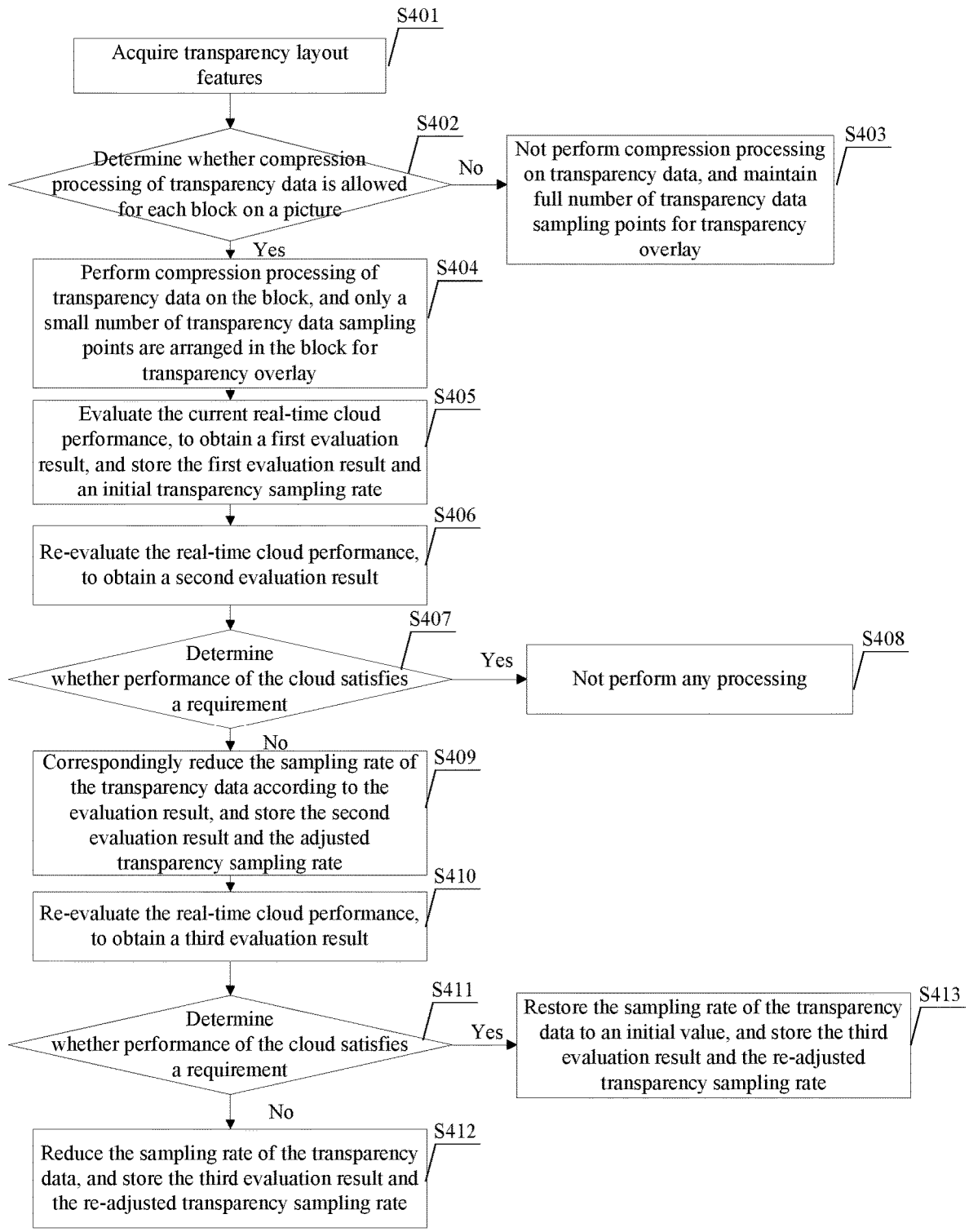
FIG. 4 is a flowchart of a transparency overlay method for a virtual set top box according to Embodiment 2 of the present disclosure.

For ease of understanding, in the embodiments of the present disclosure, the transparency overlay method for a virtual set top box is described by using a specific example. As shown in FIG. 4, the transparency overlay method for a virtual set top box includes operations S401 to S413.

At S401, transparency layout features are acquired.

In the embodiments of the present disclosure, two intelligent block division algorithms are preset, which are respectively a sequence block division algorithm and a tree block division algorithm. First, a screen is intelligently divided into blocks by means of the sequence block division algorithm, and it is determined whether the transparency of each block after block division is relatively monotonous and consistent; if so, the block is locked. After all the blocks are processed, the block division algorithm is adjusted for the remaining unlocked blocks, and the unlocked blocks are intelligently divided into blocks again by using the tree block division algorithm, and it is determined again whether the transparency of each block after block division is relatively monotonous and consistent; if so, the block is locked. After the two block division algorithms complete block division, the acquisition of transparency layout features ends.

At S402, the transparency layout features are analyzed, and it is determined whether compression processing of transparency data is allowed for each block on a picture, if not, proceeding to S403, and if so, proceeding to S404.

The transparency layout features include locked blocks and unlocked blocks. The transparency of the locked blocks is relatively monotonous and consistent. The unlocked blocks include multiple transparencies. The locked regions allow for compression processing of transparency data, and the unlocked blocks do not allow for compression processing of transparency data.

At S403, compression processing is not performed on transparency data, and full number of transparency data sampling points are maintained for transparency overlay.

At S404, compression processing of transparency data is performed on blocks, and only a small number of transparency data sampling points are arranged in the blocks for transparency overlay.

The small number of transparency data sampling points are relative to the full number, for example, if the full number is 1000, the small number is 100. In the embodiments of the present disclosure, even a single transparency data sampling point may be arranged in the block to complete transparency overlay, for example, a single transparency data sampling point may be arranged when the area of the block is relatively small. Compared with the original manner in which full number of transparency data sampling points are used for the block, the current transparency data amount acquired by performing transparency overlay on transparency sampling points can be almost negligible. When there are several blocks allowing for compression processing of transparency data on the screen, the overall transmission amount of the transparency data will be greatly reduced.

At S405, the current real-time cloud performance is evaluated, to acquire a first evaluation result, and the first evaluation result and an initial sampling rate of the transparency data are stored.

In the embodiments of the present disclosure, the working speed of a cloud virtual machine, the responding timeliness of cloud applications, the occupancy situation of cloud system resources, the CPU occupancy rate of the cloud server, and the fluency of interaction between a terminal (a physical end) and the cloud are evaluated. The described evaluation parameters constitute evaluation indexes of a cloud performance automatic evaluation module, and a standardized algorithm can be selected for each of these indexes according to distribution features of the index, thereby acquiring an evaluation value. By means of a sum of the described five evaluation values $$y = \sum_{i=1}^{n} w_i x_i,$$

$w_i$ is the weight of an ith evaluation index, $x_i$ is an evaluation value of the ith evaluation index, and y is the comprehensive evaluation value, the first evaluation result y1 can be calculated.

At S406, the real-time cloud performance is re-evaluated, to acquire a second evaluation result.

After a preset period of time, the real-time cloud performance is re-evaluated, and the process of acquiring the second evaluation result y2 is the same as that of the first evaluation result, and is not repeated herein again, wherein the preset period of time may be a fixed period of time.

At S407, whether the performance of the cloud satisfies requirements is determined according to the first evaluation result and the second evaluation result, if not, proceeding to S409, and if so, proceeding to S408.

In the embodiments of the present disclosure, if y2 is less than y1, it represents that the current cloud performance cannot satisfy requirements; and if y2 is greater than y1, it indicates that the current cloud performance satisfies requirements.

At S408, no processing is performed.

If the current cloud performance is greater than the initial cloud performance, no processing may be performed. In some embodiments, alternatively, a preset sampling rate value may be increased on the basis of the initial sampling rate a of the transparency data corresponding to the first evaluation result.

At S409, the sampling rate of the transparency data is correspondingly reduced according to the evaluation result, and the second evaluation result and the adjusted sampling rate of the transparency data are stored.

Firstly, the initial sampling rate a of the transparency data (including a small number of sampling points in locked blocks and full number of sampling points in unlocked blocks) is acquired, and on the basis of the initial sampling rate, the sampling rate of the transparency data is reduced to b (b<a). As an exemplary implementation, by uniformly reducing the distribution of full number of sampling points in unlocked blocks according to the size of a picture, the sampling rate is reduced. The second evaluation result y2 and the sampling rate b of the transparency data after the adjustment are stored, which provides basis for a next decision as to whether to dynamically adjust the sampling rate of the transparency data, and the current transparency overlay is performed based on the sampling rate b of the transparency data.

At S410, the real-time cloud performance is re-evaluated, to acquire a third evaluation result.

After a preset period of time, the third evaluation result y3 is acquired.

At S411, it is determined whether the performance of the cloud satisfies requirements, if not, proceeding to S412, and if so, proceeding to S413.

The third evaluation result y3 is compared with the second evaluation result y2, and if y3 is less than y2, it indicates that the current cloud performance cannot satisfy requirements; and if y3 is greater than y2, it indicates that the current cloud performance satisfies requirements.

At S412, the sampling rate of the transparency data is reduced, and the third evaluation result and the re-adjusted sampling rate of the transparency data are stored.

The sampling rate b of the transparency data is acquired, and on the basis of the sampling rate b, the sampling rate of the transparency data is reduced to c, wherein sampling rate differences (b−c) and (a−b) may be the same or may also be different. The third evaluation result y3 and the re-adjusted sampling rate c of the transparency data are stored, and the current transparency overlay is performed based on the sampling rate c of the transparency data.

At S413, the sampling rate of the transparency data is restored to the initial value, and the third evaluation result and the re-adjusted sampling rate of the transparency data are stored.

The current sampling rate of the transparency data is restored to the sampling rate a, the third evaluation result y3 and the re-adjusted sampling rate a of the transparency data are stored, and the current transparency overlay is performed based on the sampling rate a of the transparency data. Subsequently, the current sampling rate of the transparency data continues to be dynamically adjusted according to the current evaluation result, the previous evaluation result, and the previous sampling rate of the transparency data.

The embodiments of the present disclosure provide a transparency overlay method for a virtual set top box, transparency layout features are acquired by means of intelligent block division algorithms and by collecting, counting and analyzing cloud data, and block-by-block compression processing is performed on transparency overlay data according to the transparency layout features; and only a small number of or even a single transparency data sampling point are arranged, to complete the transparency overlay. For blocks not allowing for compression processing, full number of sampling points are used to acquire transparency data in the original manner. In addition, the real-time cloud performance can be automatically evaluated, and the sampling rate of the transparency overlay data can be dynamically adjusted, and thus the transmission amount of transparency data can be effectively reduced, the transparency overlay efficiency is increased, the performance bottleneck of transparency overlay efficiency can be solved, and the overall performance of the virtual set top box can be improved.

Embodiment 3

Figure 5:
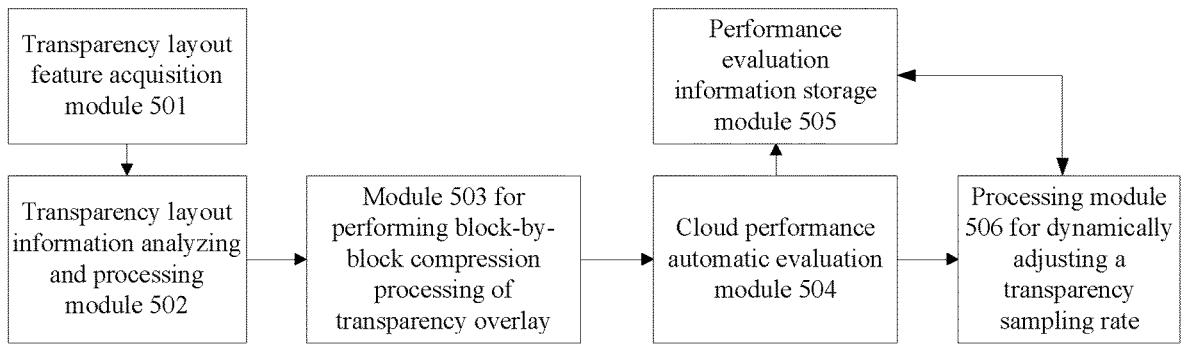
FIG. 5 is a schematic structural diagram of a virtual set top box according to Embodiment 3 of the present disclosure.

The embodiments of the present disclosure provide a virtual set top box. As shown in FIG. 5, the virtual set top box includes: a transparency layout feature acquisition module 501, a transparency layout information analyzing and processing module 502, a module 503 for performing block-by-block compression processing of transparency overlay, a cloud performance automatic evaluation module 504, a performance evaluation information storage module 505, and a processing module 506 for dynamically adjusting a sampling rate of the transparency data.

Figure 6:
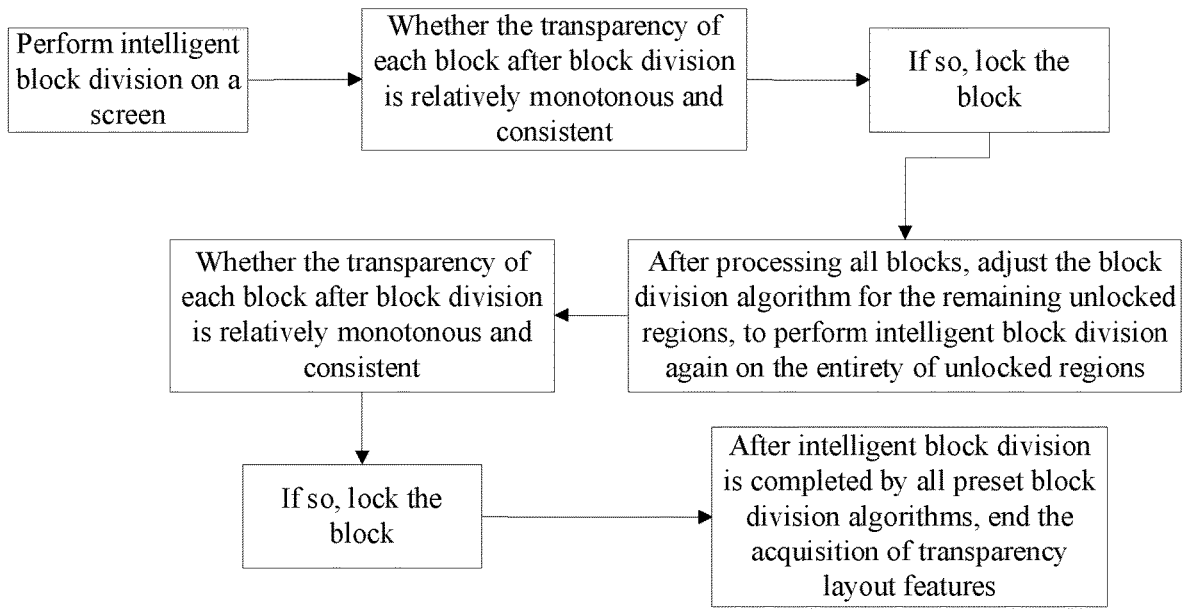
FIG. 6 is a schematic functional diagram of a transparency layout feature acquisition module according to Embodiment 3 of the present disclosure.

The transparency layout feature acquisition module 501 acquires transparency layout features of a picture presented by a current application scenario of the virtual set top box user. Several common intelligent block division algorithms for a screen are preset. After performing initial intelligent block division, it is determined whether the transparency of each block is relatively monotonous and consistent, and if so, the block is locked. When performing intelligent block division again, the block division algorithm is adjusted to perform intelligent block division again on the entirety of remaining unlocked regions, and it is also determined whether the transparency of each block is relatively monotonous and consistent, and if so, the block is locked. After block division is completed by several common intelligent block division algorithms, the acquisition of transparency layout features is completed, as shown in FIG. 6.

The transparency layout information analyzing and processing module 502 performs analyzing and processing on the acquired transparency layout feature information, so as to provide data basis for performing block-by-block compression processing of transparency overlay.

Figure 7:
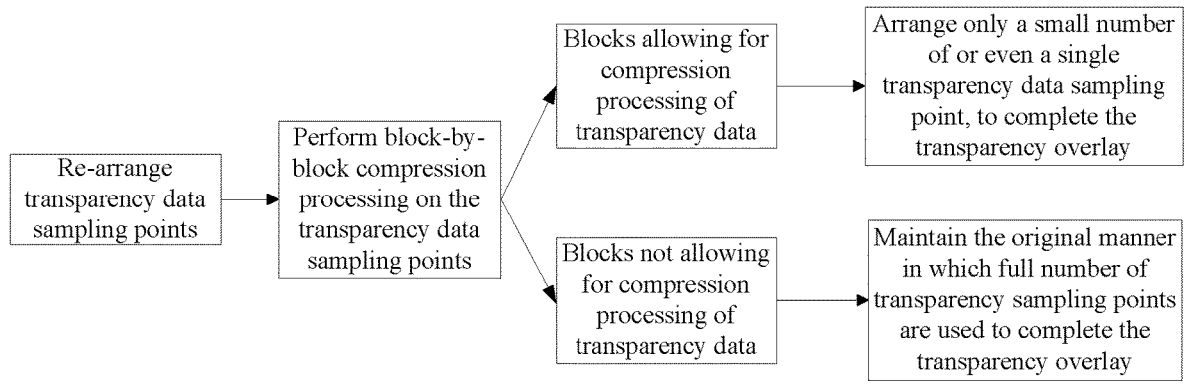
FIG. 7 is a schematic functional diagram of a module for block-by-block compression processing of transparency overlay according to Embodiment 3 of the present disclosure.

The module 503 for performing block-by-block compression processing of transparency overlay performs compression processing of transparency overlay data with regard to blocks allowing for compression processing of transparency data after block division. Only a small number of or even a single transparency data sampling point are arranged in the block to complete the transparency overlay. Compared with the original manner in which full number of transparency data sampling points are used for the block, the current transparency data amount acquired by performing transparency overlay on transparency sampling points can be almost negligible. For blocks not allowing for compression processing, full number of sampling points are used to acquire transparency data in the original manner, as shown in FIG. 7. The blocks having relative monotonous and consistent transparency allow for compression processing. When there are several blocks allowing for compression processing of transparency data on the screen, the overall transmission amount of the transparency data will be greatly reduced. Moreover, such a situation is not rare for the application scenarios of the virtual set top box.

Figure 8:
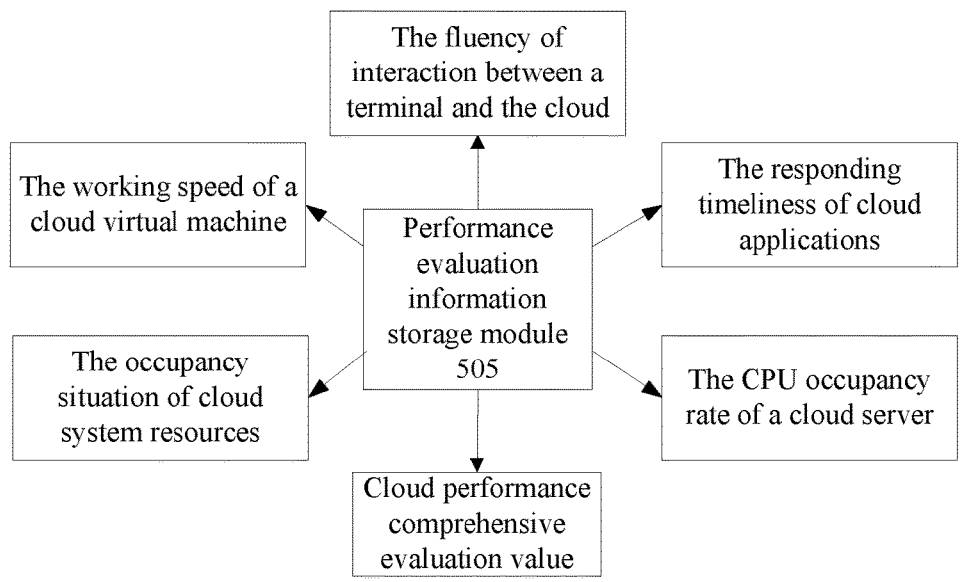
FIG. 8 is a schematic functional diagram of a cloud performance automatic evaluation module according to Embodiment 3 of the present disclosure.

The cloud performance automatic evaluation module 504 automatically evaluates the current real-time performance condition of a virtual machine of a cloud server of the virtual set top box, which further provides data basis for dynamically adjusting the sampling rate of the transparency data. The specific evaluation parameters are composed of a series of parameters which can affect the performance of the cloud and the user satisfaction. For example, the evaluation parameters may include the working speed of a cloud virtual machine, the responding timeliness of cloud applications, the occupancy situation of cloud system resources, the CPU occupancy rate of the cloud server, and the fluency of interaction between a terminal (a physical end) and the cloud. The described evaluation parameters constitute evaluation indexes of the cloud performance automatic evaluation module, and a standardized algorithm can be selected for each of these indexes according to distribution features of the index, thereby acquiring an evaluation value. For example, the responding timeliness of cloud applications may be acquired by dividing time consumed for completely starting several specific applications and making the several specific applications enter a working state by the optimal ideal time consumed. For another example, the fluency of interaction between a terminal (a physical end) and the cloud can be acquired by dividing the number of packet losses obtained by packet capture analysis during transmission between the cloud and the terminal (the physical end) via a protocol by the total number of packets. Regarding other evaluation parameters, performance evaluation systems in the industry can be used, and can be used as a part of the cloud performance automatic evaluation module. By quantifying various evaluation indexes, a final cloud performance comprehensive evaluation value can be acquired by using a mathematical model constructed by a linear weighting method. The mathematical model is, for example, $$y = \sum_{i=1}^{n} w_i x_i;$$

wherein $w_i$ is a weight of an ith evaluation index, $x_i$ is an evaluation value of the ith evaluation index. The weights of all evaluation indexes are set by the systems, and the sum of the weights of all the evaluation indexes is 1. The purpose of this module is to objectively evaluate the cloud performance condition from different aspects and different dimensions by using analysis and evaluation tools, to acquire an objective and independent cloud performance comprehensive evaluation value, as shown in FIG. 8.

Figure 9:
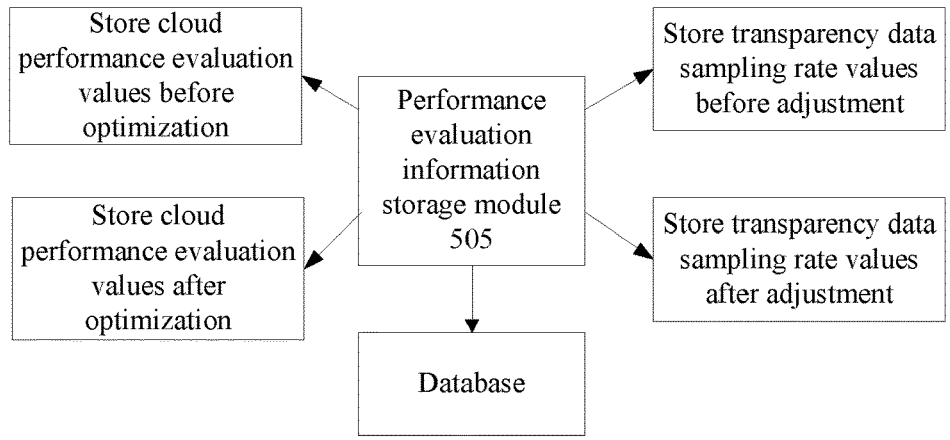
FIG. 9 is a schematic functional diagram of a performance evaluation information storage module according to Embodiment 3 of the present disclosure.

The performance evaluation information storage module 505 stores cloud performance evaluation values before and after optimization and sampling rate of the transparency data values before and after adjustment, which provides data basis for dynamically adjusting the sampling rate of the transparency data, and provides objective parameters for cloud performance optimization effect as reference, as shown in FIG. 9. The performance evaluation value of the cloud before optimization is the previous performance evaluation value, and the sampling rate of the transparency data before adjustment is the previous sampling rate. The performance evaluation value of the cloud after optimization is the current performance evaluation value, and the sampling rate of the transparency data after adjustment is the current sampling rate.

Figure 10:
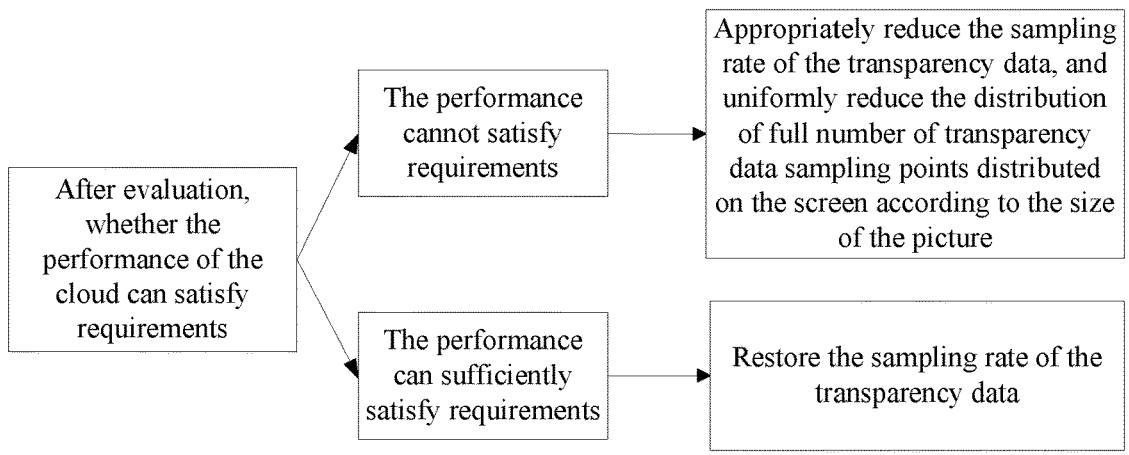
FIG. 10 is a schematic functional diagram of a processing module for dynamically adjusting a sampling rate of the transparency data according to Embodiment 3 of the present disclosure.

The processing module 506 for dynamically adjusting a sampling rate of the transparency data, appropriately reduces the sampling rate of the transparency data if the performance of the cloud cannot satisfy requirements (that is, the current performance evaluation value is less than the previous performance evaluation value), and uniformly reduces the distribution of full number of transparency data sampling points distributed on the screen according to the size of the picture, that is, the sampling rate is reduced on the basis of the previous sampling rate, which greatly reduces the transmission amount of transparency data while substantially maintaining the display picture quality of a virtual set top box terminal. If the performance of the cloud can satisfy requirements, the sampling rate of the transparency data is dynamically restored to the original value. That is, when the current performance evaluation value is greater than the previous performance evaluation value, the current sampling rate is restored to the original value, as shown in FIG. 10.

Embodiment 4

Figure 11:
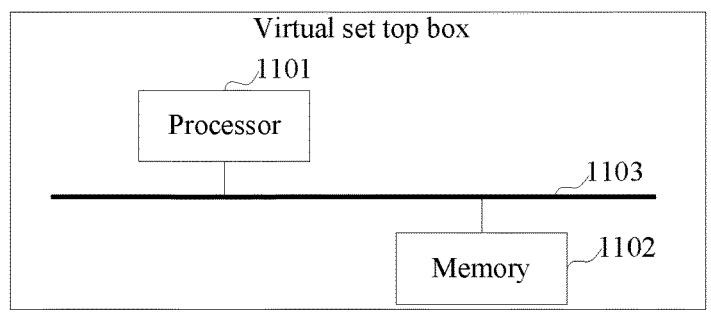
FIG. 11 is a schematic structural diagram of a virtual set top box according to Embodiment 4 of the present disclosure.

This embodiment further provides a virtual set top box. Referring to FIG. 11, the virtual set top box includes a processor 1101, a memory 1102, and a communications bus 1103.

The communication bus 1103 is configured to implement connection communication between the processor 1101 and the memory 1102.

The processor 1101 is configured to execute one or more computer programs stored in the memory 1102, so as to implement at least one operation of the transparency overlay method for a virtual set top box in each of the described embodiments.

This embodiment further provides a storage medium that includes volatile or non-volatile, removable or non-removable media implemented in any method or technology for storage of information (such as computer-readable instructions), data structures, computer program modules, or other data. The storage media include but are not limited to, RAM (Random Access Memory), ROM (Read-Only Memory), EEPROM (Electrically Erasable Programmable Read Only Memory), flash memory or other memory technology, CD-ROM (Compact Disc Read-Only Memory), digital versatile disk (DVD) or other optical disk storage, magnetic cassettes, magnetic tapes, magnetic disk storage or other magnetic storage devices, or any other medium which can be used to store desired information and can be accessed by a computer.

The storage medium in this embodiment may be configured to store one or more computer programs, and the one or more computer programs stored in the storage medium may be executed by a processor, so as to implement at least one operation of the transparency overlay method for a virtual set top box in each of the described embodiments.

Hence, a person having ordinary skill in the art should understand that the functional modules/units in all or some of the operations, systems and devices in the transparency overlay methods disclosed above may be implemented as software (which may be implemented by computer program codes executable by a computing device), firmware, hardware and appropriate combinations thereof. In a hardware embodiment, the division of functional modules/units mentioned in the description above does not necessarily correspond to the division of physical components; for example, one physical component may have multiple functions, or one function or operation may be performed cooperatively by several physical components. Some or all of the physical components may be implemented as software executed by a processor, such as a central processing unit, a digital signal processor, or a microprocessor, or implemented as hardware, or implemented as an integrated circuit, such as an application specific integrated circuit.

In addition, as known to a person having ordinary skill in the art, communication media typically include computer-readable instructions, data structures, computer program modules, or other data in a modulated data signal such as a carrier or other transport mechanisms, and may include any information delivery media. Hence, the present disclosure is not limited to any specific combinations of hardware and software.

The content above relates to further detailed description of embodiments of the present disclosure in conjunction with specific embodiments, and it cannot be determined that the specific embodiments of present disclosure are only limited to these illustrations. For a person having ordinary skill in the technical field to which the present disclosure belongs, several simple deductions or replacements may also be made without departing from the concept of some embodiments of the present disclosure, and all these deductions and improvements shall be considered as belonging to the scope of protection of the present disclosure.

INDUSTRIAL APPLICABILITY

According to the transparency overlay method for a virtual set top box, the virtual set top box and the storage medium provided by the embodiments of the present disclosure, by acquiring transparency layout features of a picture presented by an application scenario of the virtual set top box; determining, according to the transparency layout features, whether compression processing of transparency data is allowed for each block on the picture; and performing compression processing of transparency data on each allowed block, and performing transparency overlay according to transparency data sampling points less than full number of transparency data sampling points in each allowed block, in certain embodiments, compression processing of transparency overlay data is performed based on blocks according to the transparency layout features, and transparency data amount acquired by performing transparency overlay on a small number of transparency data sampling points can be almost negligible, thereby reducing the overall transmission amount of the transparency data, increasing the transparency overlay efficiency, and ensuring the performance of the virtual set top box.

What is claimed is:

1. A transparency overlay method for a virtual set top box, the transparency overlay method comprising:
   acquiring transparency layout features of a picture presented by an application scenario of the virtual set top box;
   determining, according to the transparency layout features, whether compression processing of transparency data is allowed for each block on the picture; and
   performing compression processing of transparency data on each allowed block, and performing transparency overlay according to transparency data sampling points less than full number of transparency data sampling points in each allowed block;

wherein acquiring transparency layout features of a picture presented by an application scenario of the virtual set top box comprises:

performing first block division processing on the picture by using a first intelligent block division algorithm;

in a case where transparency values in at least one first block after block division are consistent, locking the at least one first block;

performing second block division processing on an entirety of unlocked blocks by using a second intelligent block division algorithm, and locking at least one second block with consistent transparency values; and acquiring the transparency layout features by using at least two intelligent block division algorithms.

2. The transparency overlay method for a virtual set top box according to claim 1, wherein determining, according to the transparency layout features, whether compression processing of transparency data is allowed for each block on the picture comprises:

the transparency layout features comprising locked blocks and unlocked blocks;

determining that compression processing of transparency data is allowed for the locked at least one first block and the locked at least one second block which have consistent transparency values;

determining that compression processing of transparency data is not allowed for the unlocked blocks, and determining to arrange full number of transparency data sampling points in the unlocked blocks.

3. The transparency overlay method for a virtual set top box according to claim 2, wherein the number of the transparency data sampling points less than the full number of transparency data sampling points comprise a single transparency data sampling point.

4. The transparency overlay method for a virtual set top box according to claim 1, wherein after performing transparency overlay according to transparency data sampling points less than full number of transparency data sampling points in each allowed block, the transparency overlay method comprises:

evaluating a real-time performance of a cloud of the virtual set top box, to acquire a first evaluation result;

dynamically adjusting a sampling rate of the transparency data according to the performance of the cloud; and performing transparency overlay according to the sampling rate of the transparency data after the adjustment.

5. The transparency overlay method for a virtual set top box according to claim 4, wherein after completing transparency overlay according to the sampling rate of the transparency data after the adjustment, the transparency overlay method comprises:

in a case of determining that the performance of the cloud reaches the preset condition, restoring the sampling rate of the transparency data to the sampling rate of the transparency data before the adjustment.

6. The transparency overlay method for a virtual set top box according to claim 4, wherein evaluating a real-time performance of a cloud of the virtual set top box, to acquire a first evaluation result comprises:

acquiring an evaluation value of an ith evaluation index of the cloud; and determining a comprehensive evaluation value of the performance of the cloud according to the evaluation value of the ith evaluation index by the following formula:

$$y = \sum_{i=1}^{n} w_i x_i, \text{ where } i = 1, 2, \ldots, n,$$

y is the comprehensive evaluation value, $x_i$ is a weight of an ith evaluation index, $x_i$ is the evaluation value of the ith evaluation index, and n is a positive integer.

7. The transparency overlay method for a virtual set top box according to claim 6, wherein determining whether the performance of the cloud reaches the preset condition comprises:

acquiring a second comprehensive evaluation value of the cloud of a previous evaluation before a current evaluation;

comparing a first evaluation value of the cloud of the current evaluation with the second comprehensive evaluation value;

in a case where the first comprehensive evaluation value is less than the second comprehensive evaluation value, determining that the performance of the cloud does not reach the preset condition; and in a case where the first comprehensive evaluation value is greater than the second comprehensive evaluation value, determining that the performance of the cloud reaches the preset condition.

8. A virtual set top box, the virtual set top box comprising a processor, a memory and a communication bus;

the communication bus is configured to implement connection communication between the processor and the memory; and the processor is configured to execute one or more computer programs stored in the memory, so as to implement following operations:

acquiring transparency layout features of a picture presented by an application scenario of the virtual set top box;

determining, according to the transparency layout features, whether compression processing of transparency data is allowed for each block on the picture; and performing compression processing of transparency data on each allowed block, and performing transparency overlay according to transparency data sampling points less than full number of transparency data sampling points in each allowed block;

wherein acquiring transparency layout features of a picture presented by an application scenario of the virtual set top box comprises:

performing first block division processing on the picture by using a first intelligent block division algorithm;

in a case where transparency values in at least one first block after block division are consistent, locking the at least one first block;

performing second block division processing on an entirety of unlocked blocks by using a second intelligent block division algorithm, and locking at least one second block with consistent transparency values; and acquiring the transparency layout features by using at least two intelligent block division algorithms.

9. A non-transitory computer-readable storage medium, wherein the storage medium has one or more computer programs stored therein, and the one or more computer programs can be executed by one or more processors, so as to implement following operations:

acquiring transparency layout features of a picture presented by an application scenario of the virtual set top box;

determining, according to the transparency layout features, whether compression processing of transparency data is allowed for each block on the picture; and performing compression processing of transparency data on each allowed block, and performing transparency overlay according to transparency data sampling points less than full number of transparency data sampling points in each allowed block;

wherein acquiring transparency layout features of a picture presented by an application scenario of the virtual set top box comprises:

performing first block division processing on the picture by using a first intelligent block division algorithm;

in a case where transparency values in at least one first block after block division are consistent, locking the at least one first block;

performing second block division processing on an entirety of unlocked blocks by using a second intelligent block division algorithm, and locking at least one second block with consistent transparency values; and acquiring the transparency layout features by using at least two intelligent block division algorithms.

10. The transparency overlay method for a virtual set top box according to claim 1, wherein the at least two intelligent block division algorithms comprise at least two of: a sequence block division algorithm, a tree block division algorithm, and a block division algorithm on the basis of cloud data and according to window sizes of different windows outputted by different applications.

11. The transparency overlay method for a virtual set top box according to claim 10, wherein the sequence block division algorithm comprises:

dividing a length m of a screen according to a size of the screen, wherein a size of each block is block=$\sqrt{m}$, so as to acquire a total of num=m/block blocks;

determining that a left endpoint of each block is l[i]=(i−1)×block+1 and a right endpoint of each block is r[i]=i×block, so that a block belong[i]=(i−1)÷block+1 to which each node belongs is acquired;

dividing a width n of the screen according to the size of the screen, wherein a size of each block is block=$\sqrt{n}$, so as to acquire a total of num=n/block blocks;

determining that an upper endpoint of each block is u[i]=(i−1)×block+1 and a down endpoint of each block is d[i]=i×block, so that a block belong[i]=(i−1)÷block+1 to which each node belongs can be acquired.

12. The transparency overlay method for a virtual set top box according to claim 1, wherein the transparency data sampling points less than full number of transparency data sampling points are randomly arranged in each allowed block, or uniformly arranged in each allowed block.

13. The transparency overlay method for a virtual set top box according to claim 4, wherein dynamically adjusting a sampling rate of the transparency data according to the performance of the cloud comprises:

in a case of determining that the performance of the cloud does not reach a preset condition according to the first evaluation result, reducing a sampling rate of the transparency data, reducing the number of the transparency data sampling points, and storing sampling rates of the transparency data before and after adjustment and a current evaluation result.

14. The transparency overlay method for a virtual set top box according to claim 6, wherein the evaluation indexes comprises at least one of:

a working speed of a cloud virtual machine, a responding timeliness of cloud applications, a occupancy situation of cloud system resources, a CPU occupancy rate of a cloud server, fluency of interaction between a terminal and the cloud.

15. The virtual set top box according to claim 8, wherein determining, according to the transparency layout features, whether compression processing of transparency data is allowed for each block on the picture comprises:

the transparency layout features comprising locked blocks and unlocked blocks;

determining that compression processing of transparency data is allowed for the locked at least one first block and the locked at least one second block which have consistent transparency values;

determining that compression processing of transparency data is not allowed for the unlocked blocks, and determining to arrange full number of transparency data sampling points in the unlocked blocks.

16. The virtual set top box according to claim 8, wherein the processor is further configured to execute one or more computer programs stored in the memory, so as to implement following operations after performing transparency overlay according to transparency data sampling points less than full number of transparency data sampling points in each allowed block:

evaluating a real-time performance of a cloud of the virtual set top box, to acquire a first evaluation result;

dynamically adjusting a sampling rate of the transparency data according to the performance of the cloud; and performing transparency overlay according to the sampling rate of the transparency data after the adjustment.

17. The virtual set top box according to claim 16, wherein the processor is further configured to execute one or more computer programs stored in the memory, so as to implement following operations after completing transparency overlay according to the sampling rate of the transparency data after the adjustment:

in a case of determining that the performance of the cloud reaches the preset condition, restoring the sampling rate of the transparency data to the sampling rate of the transparency data before the adjustment.

18. The virtual set top box according to claim 16, wherein evaluating a real-time performance of a cloud of the virtual set top box, to acquire a first evaluation result comprises:

acquiring an evaluation value of an ith evaluation index of the cloud; and determining a comprehensive evaluation value of the performance of the cloud according to the evaluation value of the ith evaluation index by the following formula:

$$y = \sum_{i=1}^{n} w_i x_i, \text{ where } i = 1, 2, \ldots, n,$$

y is the comprehensive evaluation value, $x_i$ is a weight of an ith evaluation index, $x_i$ is the evaluation value of the ith evaluation index, and n is a positive integer.

* * * * *